United States Patent
Zergiebel (10) Patent No.: US 11,872,563 B2
(45) Date of Patent: Jan. 16, 2024

(54) REAGENT CONTAINER AND METHODS OF USE

(71) Applicant: LIFE TECHNOLOGIES CORPORATION, Carlsbad, CA (US)

(72) Inventor: Earl Zergiebel, Guilford, CT (US)

(73) Assignee: Life Technologies Corporation, Carlsbad, CA (US)

( * ) Notice: Subject to any disclaimer, the term of this patent is extended or adjusted under 35 U.S.C. 154(b) by 196 days.

(21) Appl. No.: 16/906,900

(22) Filed: Jun. 19, 2020

(65) Prior Publication Data
US 2020/0398279 A1 Dec. 24, 2020

Related U.S. Application Data (60) Provisional application No. 62/863,704, filed on Jun. 19, 2019.

(51) Int. Cl.
*B01L 3/00* (2006.01)
*B01L 3/02* (2006.01)
*B01L 9/00* (2006.01)

(52) U.S. Cl.
CPC ............ *B01L 3/527* (2013.01); *B01L 3/0293* (2013.01); *B01L 3/50855* (2013.01); *B01L 3/523* (2013.01); *B01L 9/543* (2013.01); *B01L 2300/0825* (2013.01); *B01L 2300/0858* (2013.01)

(58) Field of Classification Search
None
See application file for complete search history.

(56) References Cited

U.S. PATENT DOCUMENTS

| | | | | |
|---|---|---|---|---|
| 5,989,499 A | * | 11/1999 | Catanzariti | B01L 7/52 422/417 |
| 2002/0155616 A1 | * | 10/2002 | Hiramatsu | B01L 3/545 422/400 |
| 2002/0172621 A1 | * | 11/2002 | Barbera-Guillem | B01L 3/50853 422/503 |
| 2009/0029422 A1 | | 1/2009 | Hanafusa et al. | |

(Continued)

FOREIGN PATENT DOCUMENTS

| EP | 2333559 A1 | 6/2011 |
|---|---|---|
| WO | WO-2012012779 A2 | 1/2012 |

OTHER PUBLICATIONS

PCT/US2020/038775, Search Report and Written Opinion, dated Oct. 20, 2020, 14 pages.

*Primary Examiner* — P. Kathryn Wright (57) ABSTRACT

A reagent container includes a base defining a plurality of wells having openings exposed at an upper surface of the base and a tube receptacle. The plurality of wells include a first set of wells and a second set of wells. Each well of the first set of wells has an opening to a well bore and a channel in communication with the well bore. The opening has a first portion disposed over the well bore and a second portion disposed over the channel. The first portion has a larger area than the second portion. An angle defined by tangents to the inner surface of the first and second portions at a junction between the first and second portions is at least 100° and not greater than 180°. The reagent container further includes a top coupled over the top surface of the base and defining windows providing access to the openings of the plurality of wells and the tube receptacle.

16 Claims, 11 Drawing Sheets

(56) References Cited

U.S. PATENT DOCUMENTS

2010/0105130 A1 4/2010 Hanafusa et al.
2017/0276682 A1* 9/2017 Park ................ G01N 33/57492

* cited by examiner

REAGENT CONTAINER AND METHODS OF USE

CROSS-REFERENCE TO RELATED APPLICATION(S)

This application claims benefit of U.S. Provisional Application No. 62/863,704, filed Jun. 19, 2019, which is incorporated herein by reference in its entirety.

FIELD OF THE DISCLOSURE

This disclosure, in general, relates to containers for storing and accessing reagents and various methods of using such containers.

BACKGROUND

Increasingly, laboratories are seeking instruments to perform testing of analytes. Preparation of such instruments can be labor-intensive, relying on the time-consuming preparation of reagent solutions. To reduce preparation times, industry is turning to pre-made reagent solutions provided to laboratory customers in kits. But, the shipping and handling of liquid reagents can lead to degradation of the reagent and spillage. As such, an improved reagent container and instrument interface would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a reagent strip can include a base that defines a plurality of wells and a top disposed over an upper surface of the base and coupled to the base. The plurality wells can include a set of wells that each have a wellbore and a channel in communication with the wellbore. The channel and wellbore can be accessible via an opening. The opening can include a first portion that is larger than a second portion. The first portion is disposed over the wellbore and the second portion is disposed over the channel. In a particular example, the first portion and second portion meet such that tangents to the inner surface of the opening perimeter of the first and second portions form an angle that is at least 90° is not greater than 180° where they meet. The plurality of wells can include another set of wells larger than or having greater volume than the first set of wells. Optionally, an opening of each of the second set of wells is larger than an opening of each well of the first set of wells. The base can further define a tube receptacle to couple with a tube. In an example, the tube can be threadedly connected to the tube receptacle of the base. Optionally, a film or foil, such as a metal or composite foil, can be applied over the openings of the plurality of wells prior to coupling the top over the base. The top can include windows through which the plurality of wells can be accessed.

In a further embodiment, a method for providing a reagent solution includes applying a first reagent solution to a well of the first set of wells, applying a second reagent solution to a well of the second set of wells, and applying a film or foil over the openings of the plurality wells. Each of the wells of the first set of wells can include a different reagent solution, the same reagent solution, or a combination thereof. Similarly, each of the wells of the second set of wells can include a similar reagent solution, a different reagent solution, or a combination thereof. The method can further include applying a reagent solution to a tube, sealing the tube, and attaching the tube to the tube receptacle of the base of the reagent container. A top can be applied over an upper surface of the base.

In another example, a method includes piercing a film or foil at a position disposed over a second portion of an opening to a well of the first set of wells, piercing the film or foil in a position over the first portion of the opening and over the wellbore, and drawing reagent solution from the wellbore of the well. The method can further include piercing the foil in a position disposed over a well of the second set of wells and drawing a solution from the well of the second set of wells. The method can also include piercing a foil disposed over a tube coupled to the tube receptacle and drawing fluid from the tube.

Such a reagent container and methods for utilizing a reagent container find particular use in a variety of analytical equipment. In particular, the reagent container can find use in analytical equipment incorporating a robotic pipetting system, such as a three-axis robotic pipetting system. In an example, such a reagent strip finds use in sample preparation equipment, such as ION Chef® by Ion Torrent®. In another example, reagent containers find particular use in combined sample preparation and sequencing devices such as the Genexus™ Sequencer by Ion Torrent® of Thermo Fisher Scientific, Inc.

Figure 1:
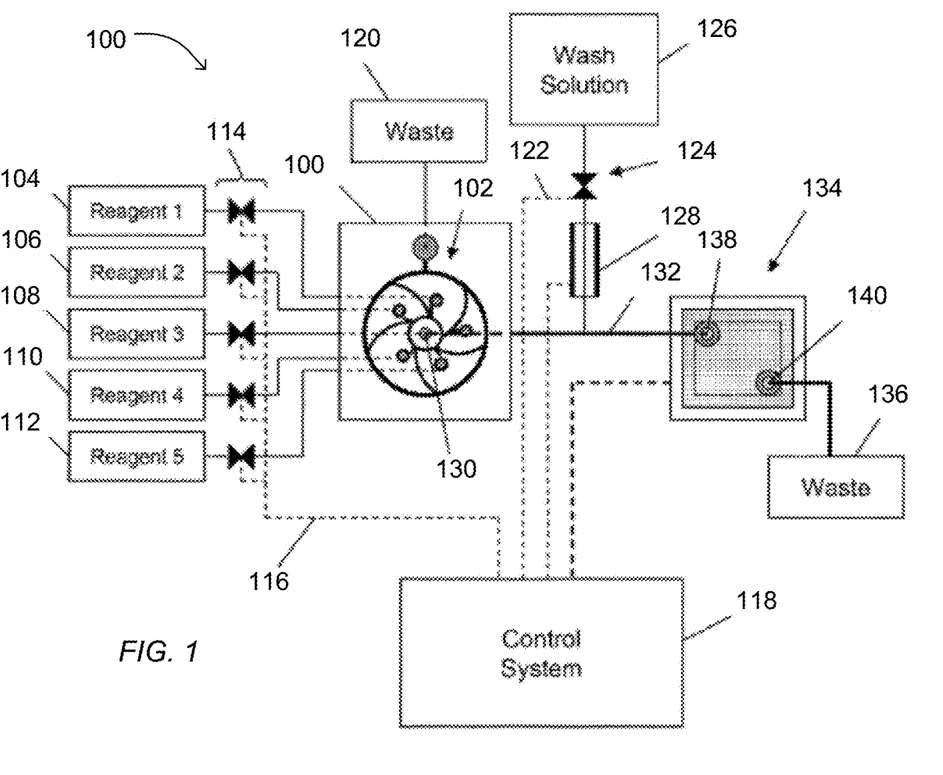
FIG. 1 includes an illustration of an example sequencing system.

FIG. 1 diagrammatically illustrates a system for carrying out pH-based nucleic acid sequencing. Each electronic sensor of the apparatus generates an output signal that depends on the value of a reference voltage. The fluid circuit permits multiple reagents to be delivered to the reaction chambers. In FIG. 1, a system 100 containing fluidics circuit 102 is connected by inlets to at least two reagent reservoirs (104, 106, 108, 110, or 112), to waste reservoir 120, and to biosensor 134 by fluid pathway 132 that connects fluidics node 130 to inlet 138 of biosensor 134 for fluidic communication. Reagents from reservoirs (104, 106, 108, 110, or 112) can be driven to fluidic circuit 102 by a variety of methods including pressure, pumps, such as syringe pumps, gravity feed, and the like, and are selected by control of valves 114. Reagents from the fluidics circuit 102 can be driven through the valves 114 receiving signals from control system 118 to waste container 120. Reagents from the fluidics circuit 102 can also be driven through the biosensor 134 to the waste container 136. The control system 118 includes controllers for valves, which generate signals for opening and closing via electrical connection 116.

The control system 118 also includes controllers for other components of the system, such as wash solution valve 124 connected thereto by electrical connection 122, and reference electrode 128. Control system 118 can also include control and data acquisition functions for biosensor 134. In one mode of operation, fluidic circuit 102 delivers a sequence of selected reagents 1, 2, 3, 4, or 5 to biosensor 134 under programmed control of control system 118, such that in between selected reagent flows, fluidics circuit 102 is primed and washed, and biosensor 134 is washed. Fluids entering biosensor 134 exit through outlet 140 and are deposited in waste container 136 via control of pinch valve regulator 144. The valve 144 is in fluidic communication with the sensor fluid output 140 of the biosensor 134.

Figure 2:
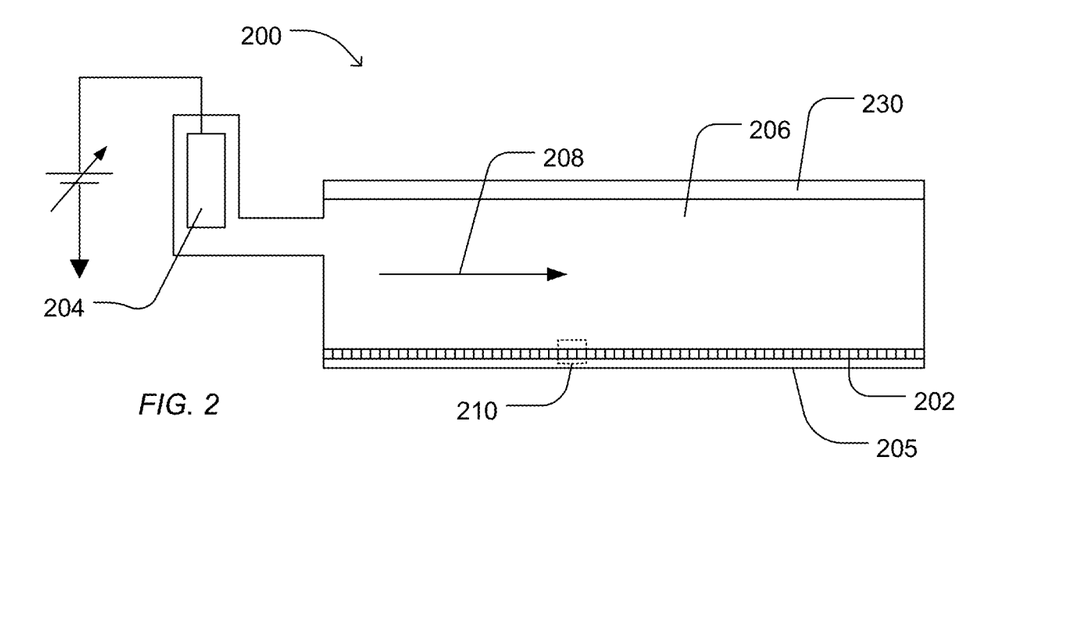
FIG. 2 includes an illustration of an example system including a sensor array.

The biosensor 134 can include the dielectric layer defining wells exposing a sensor pad and finds particular use in detecting chemical reactions and byproducts, such as detecting the release of hydrogen ions in response to nucleotide incorporation, useful in genetic sequencing, among other applications. In a particular embodiment, a sequencing system includes a flow cell in which a biosensor sensory array is disposed, includes communication circuitry in electronic communication with the sensory array, and includes containers and fluid controls in fluidic communication with the flow cell. In an example, FIG. 2 illustrates an expanded and cross-sectional view of a flow cell 200 and illustrates a portion of a flow chamber 206. A reagent 208 flows across a surface of a well array 202, in which the reagent 208 flows over the open ends of wells of the well array 202. The well array 202 and a sensor array 205 together may form an integrated unit forming a lower wall (or floor) of flow cell 200. A reference electrode 204 may be fluidly coupled to flow chamber 206. Further, a flow cell cover 230 encapsulates flow chamber 206 to contain reagent flow 208 within a confined region.

Figure 3:
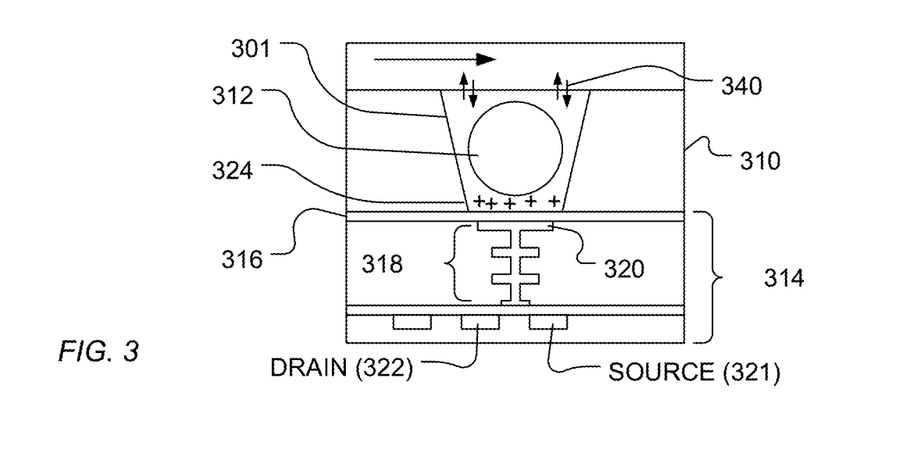
FIG. 3 includes an illustration of an example sensor and associated microwell.

FIG. 3 illustrates an expanded view of a well 301 and a sensor 314, as illustrated at 210 of FIG. 2. The volume, shape, aspect ratio (such as base width-to-well depth ratio), and other dimensional characteristics of the wells may be selected based on the nature of the reaction taking place, as well as the reagents, byproducts, or labeling techniques (if any) that are employed. The sensor 314 can be a chemical field-effect transistor (chemFET), more specifically an ion-sensitive FET (ISFET), with a floating gate 318 having a sensor plate 320 optionally separated from the well interior by a passivation layer 316. The sensor 314 can be responsive to (and generate an output signal related to) the amount of a charge 324 present on passivation layer 316 opposite the sensor plate 320. Changes in the charge 324 can cause changes in a current between a source 321 and a drain 322 of the chemFET. In turn, the chemFET can be used directly to provide a current-based output signal or indirectly with additional circuitry to provide a voltage-based output signal. Reactants, wash solutions, and other reagents may move in and out of the wells by a diffusion mechanism 340.

In an embodiment, reactions carried out in the well 301 can be analytical reactions to identify or determine characteristics or properties of an analyte of interest. Such reactions can generate directly or indirectly byproducts that affect the amount of charge adjacent to the sensor plate 320. If such byproducts are produced in small amounts or rapidly decay or react with other constituents, then multiple copies of the same analyte may be analyzed in the well 301 at the same time to increase the output signal generated. In an embodiment, multiple copies of an analyte may be attached to a solid phase support 312, either before or after deposition into the well 301. The solid phase support 312 may be microparticles, nanoparticles, beads, solid or porous comprising gels, or the like. For simplicity and ease of explanation, the solid phase support 312 is also referred herein as a particle or bead. For a nucleic acid analyte, multiple, connected copies may be made by rolling circle amplification (RCA), exponential RCA, or like techniques, to produce an amplicon without the need of a solid support.

Figure 4:
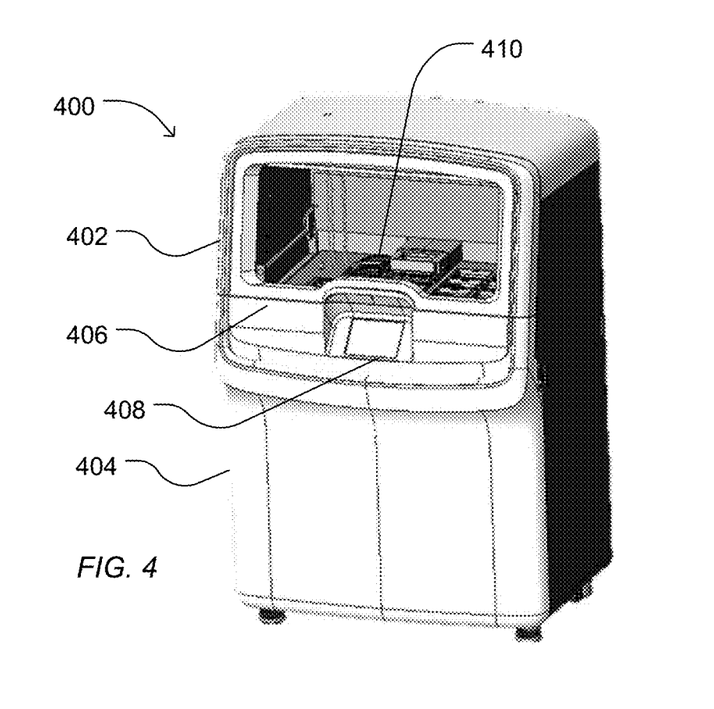
FIG. 4 includes an illustration of an example analytical device.

FIG. 4 includes an illustration of an example device 400 incorporating a three-axis pipetting robot. In an example, the device 400 can be a sequencer incorporating a sample prep preparation platform. For example, the device 400 can include an upper portion 402 and a lower portion 404. The upper portion can include a door 406 to access a deck 410 on which samples, reagent containers, and other consumables are placed. The lower portion can include a cabinet for storing additional reagent solutions and other parts of the device 400. In addition, the system can include a user interface, such as a touchscreen display 408.

Figure 5:
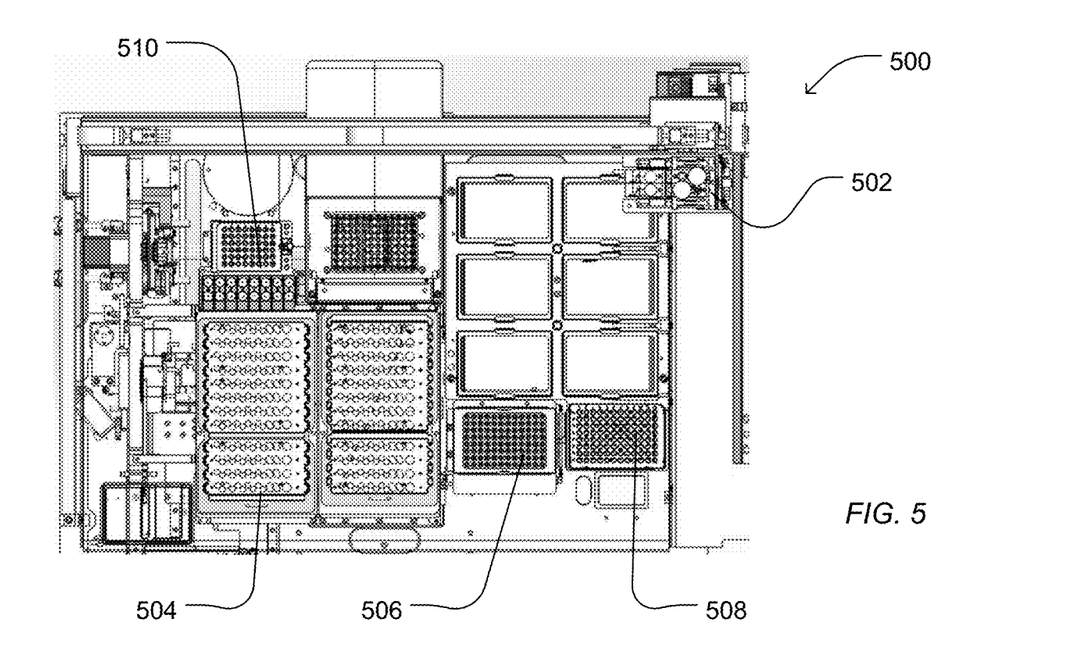
FIG. 5 includes an illustration of an example layout of an automated analytical device.

The deck 410 can include a variety of positions at which different reagent containers or samples containers are placed. For example, as illustrated in FIG. 5, a deck 500 of the device can include a three-axis robotic pipetting system 502 and various positions for placing reagent solutions, samples, and other consumables for use by the device. For example, the consumables can include disposable pipette tips, single use electronics, multi-well plates, and reagent strips, among other consumables. Consumables and reagent containers can, for example, be positioned at various locations such as receptacles 504, 506, 508, and 510. For example, a set of reagent strips can be disposed at receptacles 504. Other reagent containers can be disposed at receptacle 510. A plate including samples, new pipette tips, or other consumables can be disposed at other locations on the deck 500.

Figure 6:
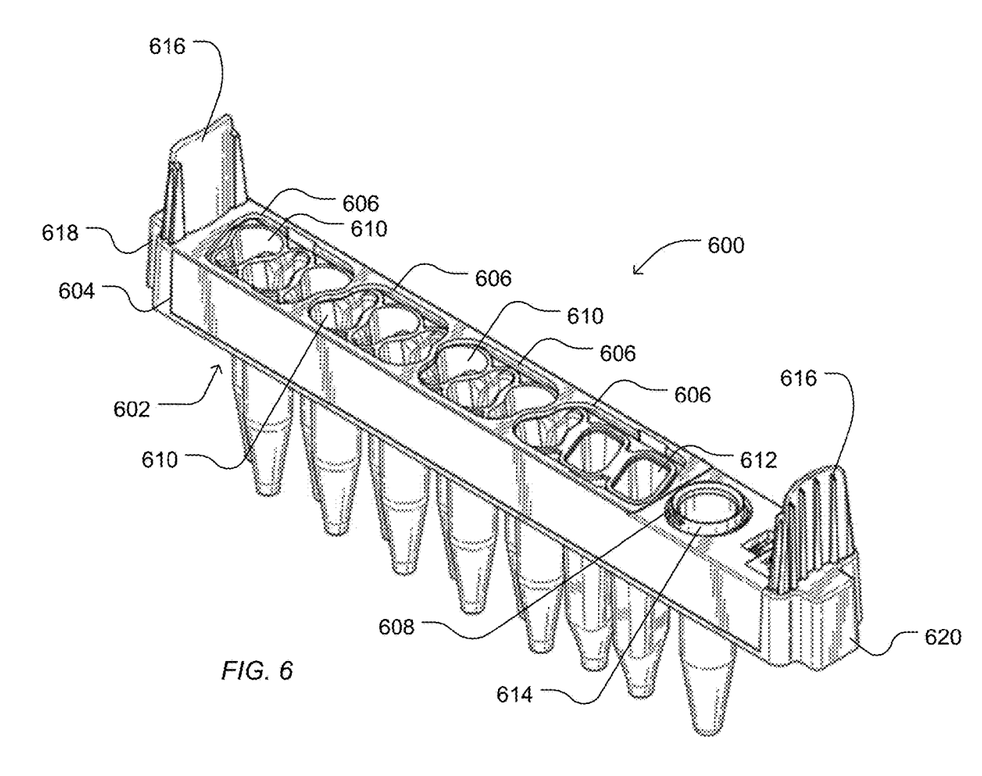
FIG. 6, FIG. 7, and FIG. 8 include illustrations on an example reagent strip.
Figure 7:
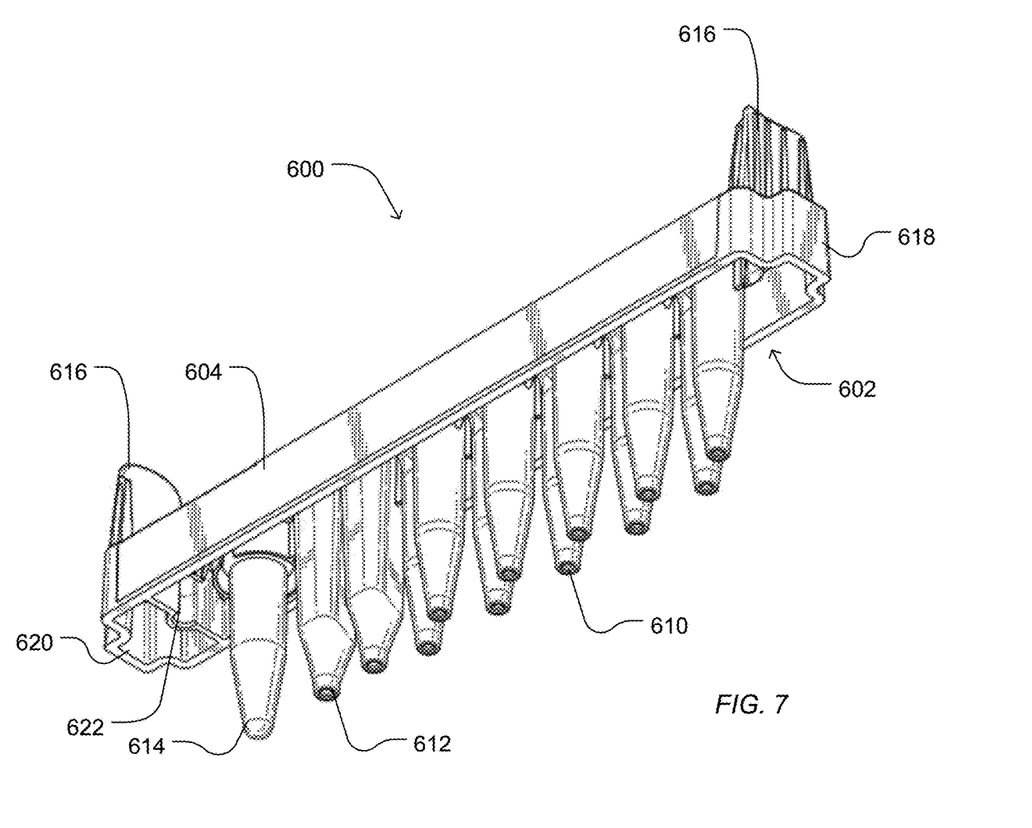
Figure 8:
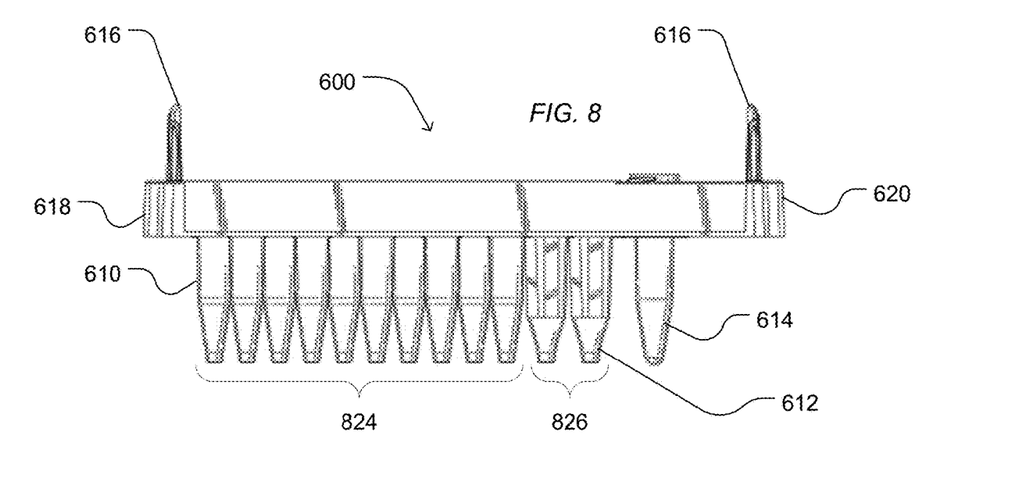

In an example, FIG. 6, FIG. 7, and FIG. 8 include illustrations of an example reagent container 600. The reagent container includes a base 602 and a top 604 coupled to the base 602. The top 604 includes windows 606 that provide access to wells 610 or 612. Optionally, the top 604 can provide a window 608 to provide access to tube 614 inserted into a tube receptacle of the base 602.

The top can further include grips 616. For example, the grips 616 can be used to hold the reagent container 600 when inserting or removing the reagent container 600 from an analytical device. Further, the top 604 can define end structures 618 or 620 configured to engage a complementary structure on the analytical equipment and limit an orientation of the reagent strip in relation to a position within the analytical equipment.

As illustrated at FIG. 7, an indexing receptacle 622 can be configured to receive an index pin or rod of an analytical device into which the reagent container 600 is placed. Such an index pin or rod and complementary receptacle 622 can further limit the orientation of the region container within the analytical equipment and limit movement of the reagent container. In particular, the end structures 618 and 620 along with the optional indexing receptacle 622 can ensure that the openings to the wells or the tube are positioned at locations programmed into the three-axis pipetting robot.

As illustrated in FIG. 8, the base 602 can define a first set 824 of wells 610 and a second set 826 of wells 612. The base 602 can further define a tube receptacle to receive tube 614. The set of wells 824 can include between 2 and 20 wells 610. For example, a set 824 of wells can include between 4 and 16 wells, such as between 6 and 12 wells 610. The set 826 of wells 612 can include one well, two wells, or more. For example, the set 826 can include between one and six wells 612, such as between two and four wells 612.

Figure 9:
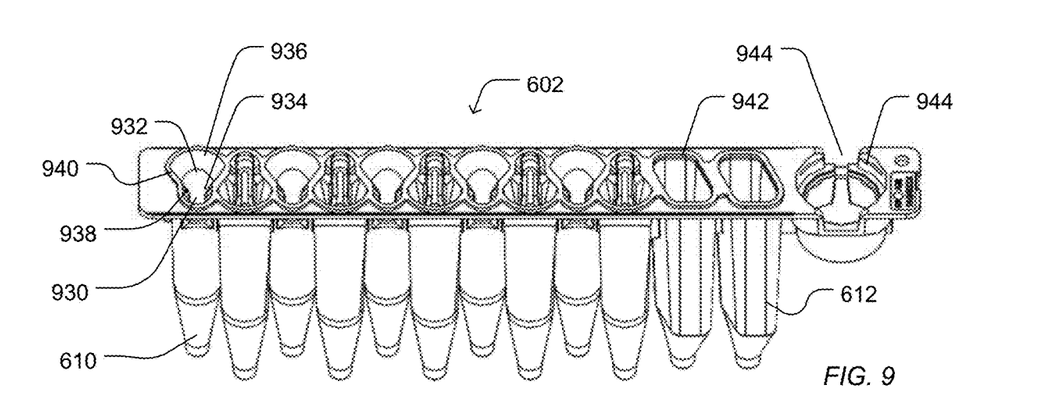
FIG. 9, FIG. 10, and FIG. 11 include illustrations of an example base of a reagent strip.
Figure 10:
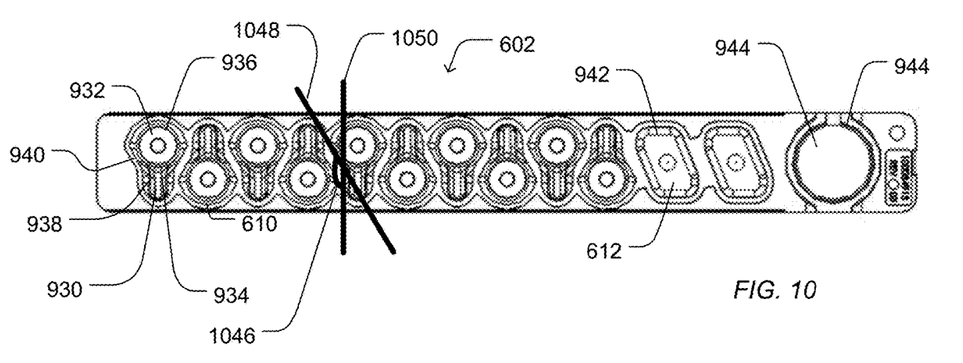

FIG. 9 and FIG. 10 include illustrations of an example base 602. The base 602 defines wells 610 accessible using openings 930 at an upper surface of the base 602. The wells 610 include a wellbore 932 and a channel 934 in fluid communication with the wellbore 932. The wellbore 932 extends the length of the well. The channel 934 opens along part of a side of the wellbore 932. The opening 930 includes a first portion 936 disposed over an opening into the wellbore 932. The opening 930 can further include a second portion 938 that opens to and is disposed over the channel 934. In particular, the wellbore 932 is configured to receive a pipette tip for drawing reagent solution from the well 610.

The opening 930 is defined by a perimeter 940 that extends around the first portion 936 and the second portion 938. As illustrated in FIG. 10, at the intersection of the first portion 936 and the second portion 938, the perimeter 940 of the opening 930 defines an angle 1046 between a tangent 1048 of the perimeter of the first portion as it approaches the intersection and a tangent 1050 of the perimeter of the second portion as it approaches the intersection. In an example, the angle 1046 is greater than 90° and less than 180°. For example, the angle 1046 can be at least 100° and not greater than 180°. In particular, the angle can be at least 110° or at least 120°. In another example, the angle is not greater than 165° or not greater than 155°.

Figure 16:
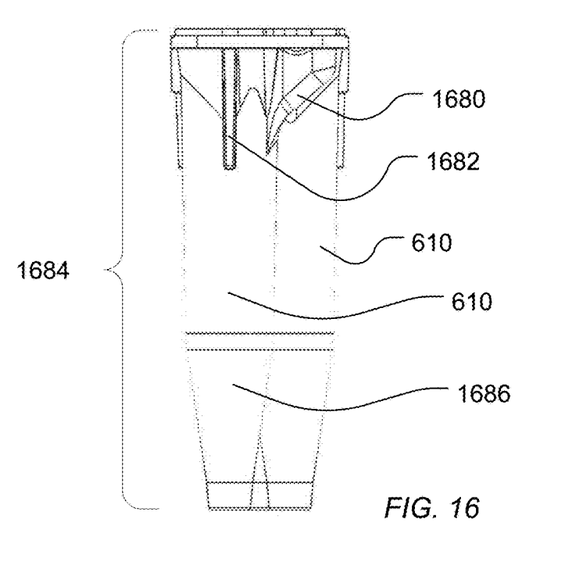
FIG. 16 includes an illustration of an end view of wells.

FIG. 16 includes an illustration of end view of the wells 610. The wells include an internal wellbore 932 extending the length 1684 of the well 610. The wellbore 932 can terminate at a conical section 1686. The channel 934 can have a tapered configuration 1680 and having a side opening into the wellbore 932 that extends a portion of the length 1684 of the wellbore 932. For example, the side opening into the wellbore can extend 5% to 50% of the length 1684 of the wellbore 932, such as 10% to 35% of the length, or 10% to 25% of the length.

Returning to FIG. 9, the base 602 further defines wells 612 having openings 942. In an example, the wells 612 defined by the base 602 can have a greater volume than wells 610 defined by the base 602. In a further example, the opening 942 can have a greater area than the opening 930. Further, the opening 942 can have a shape different from the opening 930.

The base 602 can further define a tube receptacle 944. The tube receptacle 944 can be configured to couple with a tube 614. In particular, the tube receptacle 944 can include a threaded coupling 946 to engage a complementary threaded coupling of the tube 614.

Figure 11:
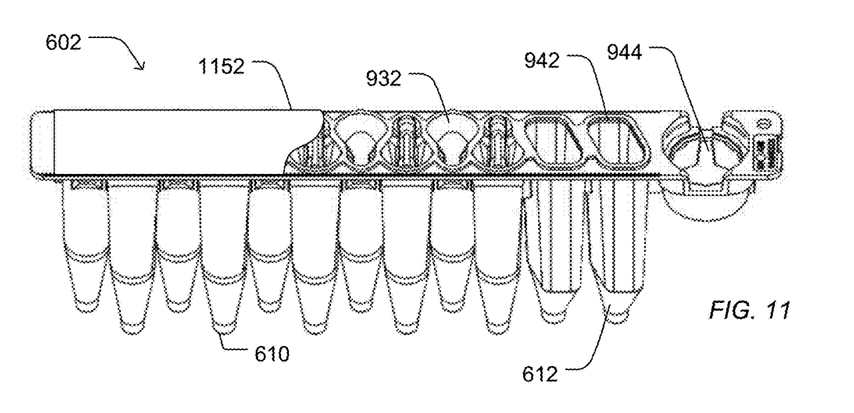

Optionally, prior to attaching the top 604 to the base 602, openings to the wells. such as openings 930 or 942, can be sealed with a film or foil. For example, as illustrated in FIG. 11, openings 932 and 942 can be sealed with a film or foil 1152 that prevents leakage or exposure of reagent solutions stored within the wells 610 or 612. In an example, the film or foil is not placed over the tube receptacle 944. The film or foil can be formed of polymer, metal, or composite materials.

Figure 12:
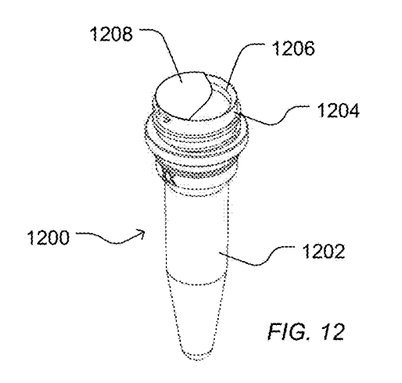
FIG. 12 includes an illustration of an example tube for use with a reagent strip.

FIG. 12 illustrates an example tube 1200 for coupling with the base 602. The tube 1200 includes a body 1202 having an opening 1206. A coupling mechanism, such as a threaded coupling 1204, can be formed on the side of the body 1202 of the tube 1200. Optionally, a film or foil 1208 can be applied over the opening 1206 of the tube 1200. The tube 1200 can be inserted into and coupled with the base 602 either before or after coupling the top 604 to the base 602.

Figure 13:
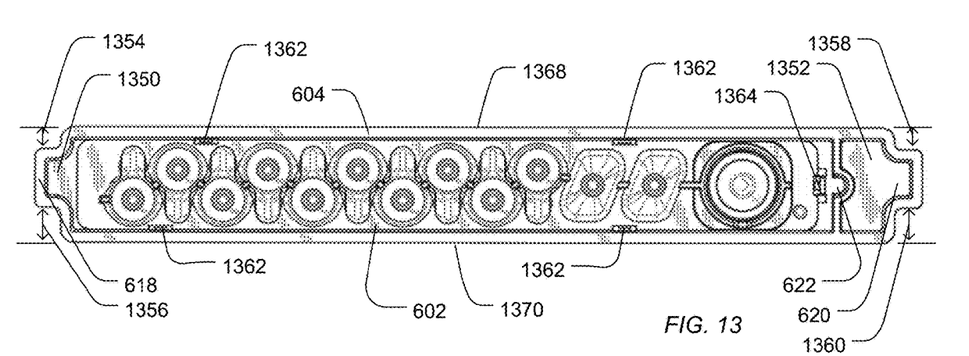
FIG. 13, FIG. 14, and FIG. 15 include illustrations of an example top of a reagent strip.
Figure 14:
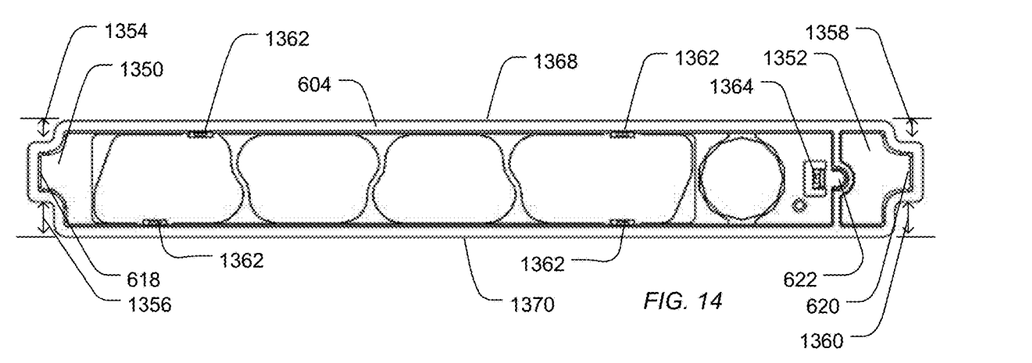
Figure 15:
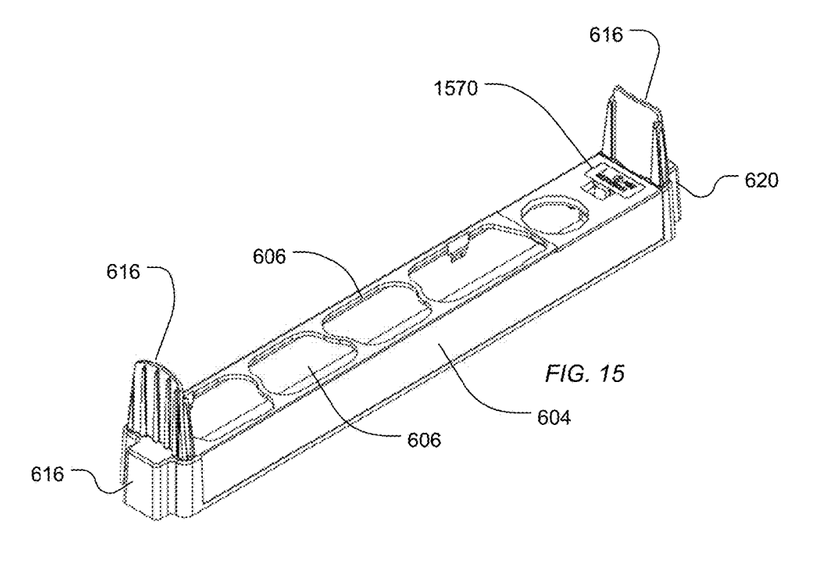

FIG. 13 includes an illustration of the top 604 coupled with the base 602 from an underside perspective, FIG. 14 includes an illustration of the top 604 absent the base 602 from an underside perspective, and FIG. 15 includes a perspective view of the top 604. The top 604 can include clips 1362 or 1364 that couple with the base 602. Alternatively, the base 602 can include clips to engage the top 604. As such, the top 604 can be secured to the base 602.

The end structures 618 and 620 can be configured to engage complementary structures within analytical equipment into which the container 600 is placed. In an example, the structures 618 and 620 can be offset equivalently from a given side. For example, the structure 618 can be offset by an amount 1354 from a side 1368. The structure 620 can be offset by an amount 1358 from the side 1368. The offset amounts 1354 and 1358 can be equivalent. In a further example, the structure 618 can be offset from the side 1370 by an amount 1356, and the structure 620 can be offset from the side 1370 by an amount 1360. In an example, the offset amounts 1356 and 1360 are equal. In a further example, the offsets 1354 and 1358 can be different from the offsets 1356 and 1360.

The top 604 can further define an index receptacle 622 that receives a rod or pen to index the location of the reagent strip when inserted into a complementary structure within an analytical equipment. Such structures 618, 620 and 622 limit possible orientations of the reagent strip or container 600 when inserted into analytical equipment having a complementary receptacle.

As illustrated in FIG. 15, the top 604 can further include an information section indicating the nature of the reagent. For example, the top 604 included a barcode or label 1570. Further, the top 604 can be colored in a manner to indicate its contents. For example, the top 604 can have a color (e.g., red, green, yellow, or blue) that can indicate what reagents are incorporated in the reagent container.

Figure 17:
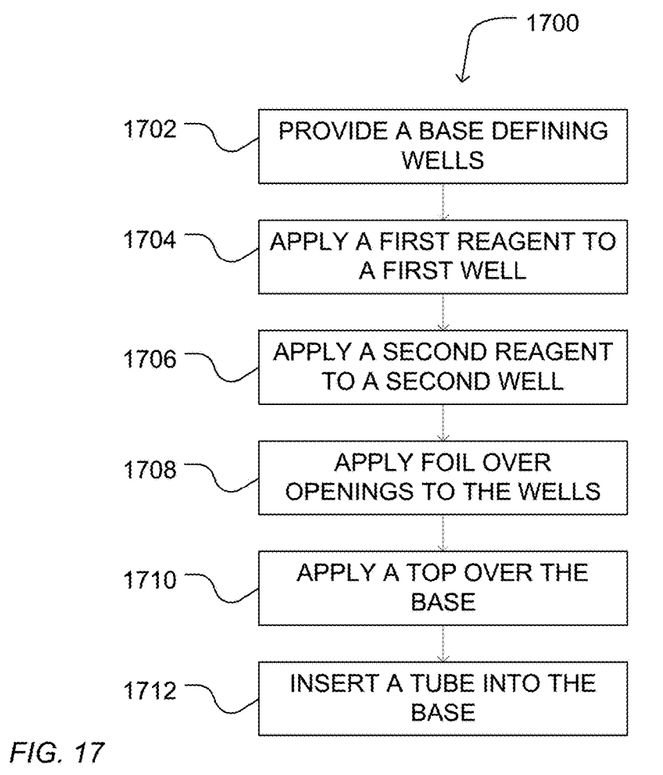
FIG. 17 and FIG. 18 include block flow diagrams of example methods for using a reagent strip.

FIG. 17 illustrates an example method 1700 for preparing a reagent container. As illustrated at block 1702, a base is provided that includes a plurality of wells having openings at an upper surface of the base. The plurality of wells can include a first set of wells, each having a wellbore and associated side channel. The plurality of wells can further include a second set of wells. The base can further define a tube receptacle.

As illustrated at block 1704, a first reagent can be applied into one or more wells of the first set of wells. In an example, all of the wells of the first set can include a similar type of reagent solution. In another example, each well of the first of wells can include a different reagent solution. In a further example, some wells of the first set of wells can include the same reagent, while other wells of the first set can include different reagents.

As illustrated at block 1706, a second reagent solution is applied to a well of the second set of wells. The wells of the second set of wells can each include the same solution, different solutions, or variations thereof.

As illustrated at block 1708, a film or foil can be applied over the upper surface of the base, enclosing or sealing the openings to the wells. In an example, the film or foil does not extend over a tube receptacle. In particular, the tube can be separately sealed using a film or foil prior to inserting the tube into the base 602.

As illustrated at 1710, the top can be applied over the base. In an example, the top clips to the base. The top can include windows that allow access to the film or foil covered openings of the base. Further, the top can have a color indicative of the set of reagents stored within the base.

Optionally, a tube can be inserted into the tube receptacle, as illustrated at block 1712. Alternatively, the tube can be inserted into the base prior to applying the top.

Figure 18:
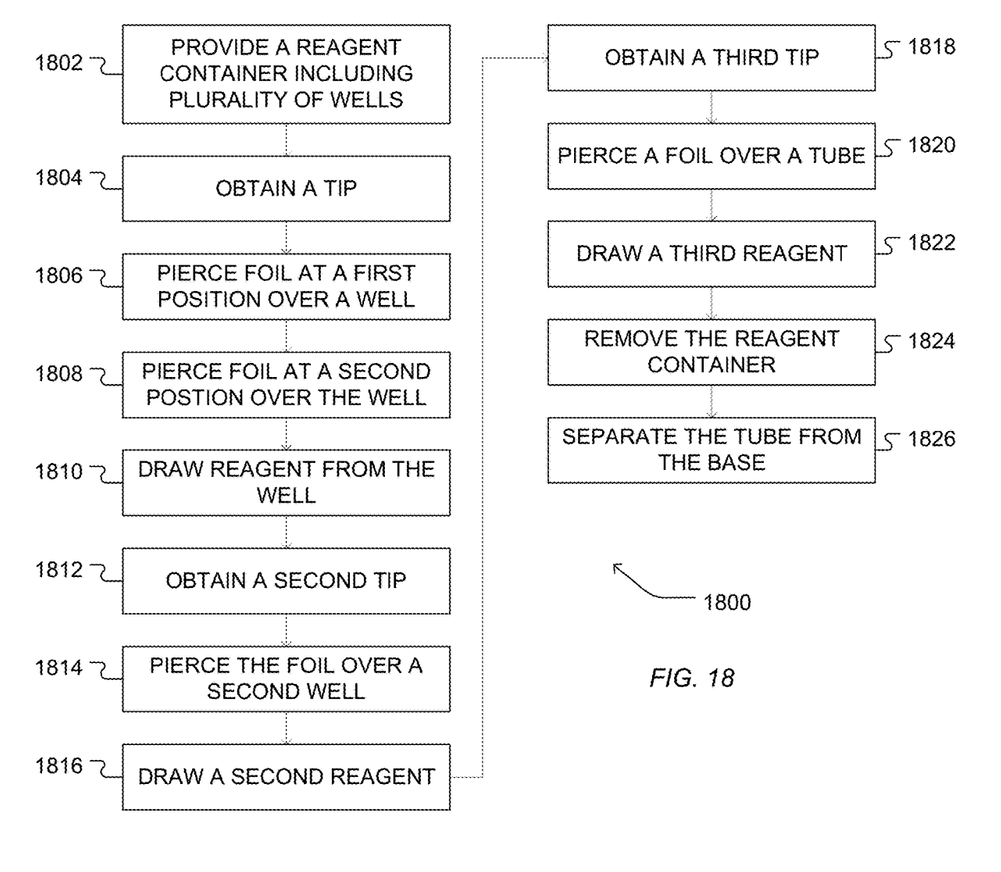

The reagent container funds particular use when used in analytical equipment to supply reagents. FIG. 18 illustrates an example method 1800 for using a reagent container. For example, the reagent container can be provided and inserted into an analytical device, as illustrated at block 1802. For example, the analytical device can include a three-axis pipetting robot. In an example, the analytical device includes a complementary receptacle to receive the reagent container. In particular, the complementary receptacle can include shapes and structures or indexing pins or rods that fit the associated structures on the reagent container.

In an example, the pipetting robot can obtain a pipette tip, as illustrated at block 1804. The pipetting robot can use the pipette tip to pierce a foil or film disposed over an opening to a well of the plurality of wells of the reagent container. In an example, the three-axis pipetting robot pierces the film or foil at a location disposed over a portion of the opening to the well disposed over a channel of the well, as illustrated at block 1806.

The three-axis pipetting robot can pierce the foil or film at a second location disposed over the wellbore and another portion of the opening, as illustrated at 1808. In particular, the three-axis robot can drive the tip into the wellbore a sufficient depth to draw a desired quantity of reagent from the wellbore and the reagent can be drawn from the well, as illustrated at block 1810. The first piercing over the channel can permit air to enter the well as reagent solution is drawn from the well and while the pipette is drawn out of the well. As such, a vacuum is prevented from being formed.

The three-axis pipetting robot can distribute the reagent solution and perform other functions until another reagent solution is to be drawn from the reagent container. For example, if a reagent disposed in a well of the second set of wells is desired, the pipetting robot can acquire a new tip, as illustrated at block 1812, and can use the new tip to pierce a film or foil disposed over the opening to a well of the second set of wells, as illustrated at block 1814. Reagent can be drawn from the well, as illustrated at block 1816, and the system can perform other functions until an additional reagent is desired from the reagent container.

When a reagent solution disposed in a removable tube is desired, the three-axis pipetting robot can acquire a new tip, as illustrated at block 1818. The three-axis robot can pierce the film or foil disposed over an opening to the tube, as illustrated at block 1820, and can draw the reagent solution from the tube, as illustrated at block 1822.

When operations are complete, the reagent container can be removed from the analytical equipment, as illustrated at block 1824. Optionally, the tube can be separated from the reagent container, as illustrated at block 1826. The reagent tube and the reagent container can be disposed separately as desired.

In a first aspect, a reagent container includes a base defining a plurality of wells having openings exposed at an upper surface of the base and a tube receptacle. The plurality of wells includes a first set of wells and a second set of wells. Each well of the first set of wells has an opening to a well bore and a channel in communication with the well bore. The opening has a first portion disposed over the well bore and a second portion disposed over the channel. The first portion has a larger area than the second portion. An angle defined by tangents to the inner surface of the first and second portions at a junction between the first and second portions is at least 100° and not greater than 180°. The reagent container further includes a top coupled over the top surface of the base and defining windows providing access to the openings of the plurality of wells and the tube receptacle.

In an example of the first aspect, a volume of wells of the second set of wells is larger than a volume of wells of the second set of wells.

In another example of the first aspect and the above examples, each well of the second set of wells has an opening larger than the opening of each well of the first set of wells.

In a further example of the first aspect and the above examples, each well of the second set of wells is free of a side channel.

In an additional example of the first aspect and the above examples, the reagent container further includes a tube, the tube receptacle removably coupled to the tube. For example, the tube receptacle has a threaded coupling to threadedly couple with the tube.

In another example of the first aspect and the above examples, the reagent container further includes a film disposed over the top surface of the base and covering openings of the plurality of openings.

In a further example of the first aspect and the above examples, the angle is not greater than 165°. For example, the angle is not greater than 150°.

In an additional example of the first aspect and the above examples, the angle is at least 120°. For example, the angle is at least 130°.

In another example of the first aspect and the above examples, the top includes clips to couple with the base.

In a further example of the first aspect and the above examples, the top includes handles extending vertically away from the top surface of the base.

In an additional example of the first aspect and the above examples, the top further defines an index receptacle.

In another example of the first aspect and the above examples, the top has first and second ends equally horizontally offset from an edge of the top.

In a second aspect, a method for providing reagents to analytical equipment includes on a reagent container including a base and a top, the base defining a plurality of wells having openings exposed at an upper surface of the base and a tube receptacle, the plurality of wells including a first set of wells and a second set of wells, each well of the first set of wells having an opening to a well bore and a channel in communication with the well bore, the opening having a first portion disposed over the well bore and a second portion disposed over the channel, the first portion having a larger area than the second portion, an angle defined by tangents to the inner surface of the first and second portions at a junction between the first and second portions being at least 100° and not greater than 180°, the top coupled over the top surface of the base and defining windows providing access to the openings of the plurality of wells and the tube receptacle; piercing, with a pipette tip attached to an automated pipette robot, a foil at a position disposed over the second portion of the opening and disposed over the channel of a well of the first set of wells; piercing, with the pipette tip attached to the automated pipette robot, the foil at a position disposed over the first portion of the opening and over the well bore of the well of the first set of wells; and drawing a reagent from the well bore of the well of the first set of wells using the pipette tip.

In an example of the second aspect, the method further includes piercing with a second pipette tip attached to the automated pipette robot the foil disposed at a position over a well of the second set of wells; and drawing a second reagent from the well of the second set of wells. For example, the method further includes piercing with a third pipette tip attached to the automated pipette robot a foil disposed over an opening of a tube disposed in the tube receptacle; and drawing a third reagent from the tube.

In a third aspect, a method for providing reagents to analytical equipment includes in a reagent container including a base and a top, the base defining a plurality of wells having openings exposed at an upper surface of the base and a tube receptacle, the plurality of wells including a first set of wells and a second set of wells, each well of the first set of wells having an opening to a well bore and a channel in communication with the well bore, the opening having a first portion disposed over the well bore and a second portion disposed over the channel, the first portion having a larger area than the second portion, an angle defined by tangents to the inner surface of the first and second portions at a junction between the first and second portions being at least 100° and not greater than 180°, the top coupled over the top surface of the base and defining windows providing access to the openings of the plurality of wells and the tube receptacle; applying a first reagent into a well of the first set of wells through the first portion of the opening; applying a second reagent into a well of the second set of wells; and attaching a foil over the openings of the plurality of wells.

In an example of the third aspect, the method further includes coupling a tube to the tube receptacle, the tube including a third reagent and a separate foil cover.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A reagent container comprising:
    a base defining a plurality of wells having openings exposed at an upper surface of the base and a tube receptacle,
    the plurality of wells including a first set of wells and a second set of wells, each well of the first set of wells having an opening at an upper surface of the base, wherein the opening is to a well bore and a channel in communication with the well bore, the opening having a first portion disposed over the well bore and a second portion disposed over the channel,
    the first portion having a larger area than the second portion, the channel having a tapered configuration and having a side opening into the wellbore that extends from an upper surface of the base along a portion of the length of the wellbore, an angle defined by tangents to the inner surfaces of the first and second portions as the inner surfaces approach a junction between the first and second portions being at least 100° and not greater than 155°;
    a top coupled over the top surface of the base and defining windows providing access to the openings of the plurality of wells and the tube receptacle;
    wherein a volume of wells of the second set of wells is larger than a volume of wells of the first set of wells; and
    wherein each well of the second set of wells has an opening larger than the opening of each well of the first set of wells.

2. The reagent container of claim 1, wherein each well of the second set of wells is free of a side channel.

3. The reagent container of claim 1, further comprising a tube, the tube receptacle removably coupled to the tube.

4. The reagent container of claim 3, wherein the tube receptacle has a threaded coupling to threadedly couple with the tube.

5. The reagent container of claim 1, further comprising a film disposed over the top surface of the base and covering openings of the plurality of openings.

6. The reagent container of claim 1, wherein the angle is at least 120°.

7. The reagent container of claim 6, wherein the angle is at least 130°.

8. The reagent container of claim 1, wherein the top includes clips to couple with the base.

9. The reagent container of claim 1, wherein the top includes handles extending vertically away from the top surface of the base.

10. The reagent container of claim 1, wherein the top further defines an index receptacle to receive an index pin or rod.

11. The reagent container of claim 1, wherein the top has first and second end structures configured to engage complementary structures within analytical equipment, the first and second end structures disposed at respective first and second ends and equally offset from one of the vertical sides of the top.

12. A method for providing reagents to analytical equipment, the method comprising:
on a reagent container including a base and a top, the base defining a plurality of wells having openings exposed at an upper surface of the base and a tube receptacle, the plurality of wells including a first set of wells and a second set of wells,
each well of the first set of wells having an opening at an upper surface of the base, wherein the opening is to a well bore and a channel in communication with the well bore, the opening having a first portion disposed over the well bore and a second portion disposed over the channel, the channel having a tapered configuration and having a side opening into the wellbore that extends from an upper surface of the base along a portion of the length of the wellbore,
the first portion having a larger area than the second portion, the first portion having a first perimeter, the second portion having a second perimeter that meets the first perimeter at a junction, an angle defined by tangents to the first and second perimeters of the first and second portions as the first and second perimeters approach a junction between the first and second portions being at least 100° and not greater than 155°, the top coupled over the top surface of the base and defining windows providing access to the openings of the plurality of wells and the tube receptacle;
wherein a volume of wells of the second set of wells is larger than a volume of wells of the first set of wells; and
wherein each well of the second set of wells has an opening larger than the opening of each well of the first set of wells;
piercing, with a pipette tip attached to an automated pipette robot, a foil at a position disposed over the second portion of the opening and disposed over the channel of a well of the first set of wells;
piercing, with the pipette tip attached to the automated pipette robot, the foil at a position disposed over the first portion of the opening and over the well bore of the well of the first set of wells; and
drawing a reagent from the well bore of the well of the first set of wells using the pipette tip.

13. The method of claim 12, further comprising:
piercing with a second pipette tip attached to the automated pipette robot the foil disposed at a position over a well of the second set of wells; and
drawing a second reagent from the well of the second set of wells.

14. The method of claim 13, further comprising:
piercing with a third pipette tip attached to the automated pipette robot a foil disposed over an opening of a tube disposed in the tube receptacle; and
drawing a third reagent from the tube.

15. A method for providing reagents to analytical equipment, the method comprising:
in a reagent container including a base and a top, the base defining a plurality of wells having openings exposed at an upper surface of the base and a tube receptacle, the plurality of wells including a first set of wells and a second set of wells, each well of the first set of wells having an opening at an upper surface of the base, wherein the opening is to a well bore and a channel in communication with the well bore, the opening having a first portion disposed over the well bore and a second portion disposed over the channel, the channel having a tapered configuration and having a side opening into the wellbore that extends from an upper surface of the base along a portion of the length of the wellbore, the first portion having a larger area than the second portion, an angle defined by tangents to the inner surfaces of the first and second portions as the inner surfaces approach a junction between the first and second portions being at least 100° and not greater than 155°, wherein a volume of wells of the second set of wells is larger than a volume of wells of the first set of wells; and
wherein each well of the second set of wells has an opening larger than the opening of each well of the first set of wells;
the top coupled over the top surface of the base and defining windows providing access to the openings of the plurality of wells and the tube receptacle;
applying a first reagent into a well of the first set of wells through the first portion of the opening;
applying a second reagent into a well of the second set of wells; and
attaching a foil over the openings of the plurality of wells.

16. The method of claim 15, further comprising coupling a tube to the tube receptacle, the tube including a third reagent and a separate foil cover.

* * * * *